United States Patent

Hagqvist et al.

Patent Number: 5,320,755
Date of Patent: Jun. 14, 1994

[54] METHOD AND APPARATUS FOR PURIFYING WATER

[75] Inventors: Peter Hagqvist, Älvsjö ; Per Fonser, Stockholm; Fredrik Dellby, Enskede, all of Sweden

[73] Assignee: AB Electrolux, Stockholm, Sweden

[21] Appl. No.: 60,087

[22] Filed: May 11, 1993

[30] Foreign Application Priority Data

May 13, 1992 [SE] Sweden ............................ 9201512.2

[51] Int. Cl.$^5$ ............................................. B01D 61/00
[52] U.S. Cl. .................................... 210/652; 210/650; 210/805; 210/321.65; 210/295; 210/87; 210/90; 210/134
[58] Field of Search ................ 210/650, 652, 805, 295, 210/433.1, 434, 87, 90, 134, 257.2, 195.2, 321.65

[56] References Cited

U.S. PATENT DOCUMENTS

| | | | |
|---|---|---|---|
| 4,243,523 | 1/1981 | Pelmulder | 210/652 |
| 4,662,208 | 5/1987 | Metzner et al. | 210/321.65 |
| 4,702,842 | 10/1987 | Lapierre | 210/652 |
| 4,772,385 | 9/1988 | Yamada et al. | 210/87 |
| 4,850,498 | 7/1989 | Taylor | 210/652 |
| 5,112,489 | 5/1992 | Hartmann | 210/257.2 |
| 5,158,681 | 10/1992 | Freeman et al. | 210/652 |
| 5,194,158 | 3/1993 | Matson | 210/650 |

FOREIGN PATENT DOCUMENTS

| | | |
|---|---|---|
| 0058304 | 8/1982 | European Pat. Off. . |
| 3719292 | 6/1987 | Fed. Rep. of Germany . |
| 50-97785 | 11/1975 | Japan . |
| WO8000310 | 3/1980 | PCT Int'l Appl. . |
| WO8802651 | 4/1988 | PCT Int'l Appl. . |

Primary Examiner—Robert A. Dawson
Assistant Examiner—Ana M. Fortuna
Attorney, Agent, or Firm—Cushman, Darby & Cushman

[57] ABSTRACT

When applying a method and an arrangement for purifying water, an inflow of contaminated water is converted to a pressure elevated flow which is divided in a purifying unit into a purified outflow and a contaminated outflow, which in turn is divided into a return flow and a reject flow. With the intention of providing a large return flow under high pressure for the purpose of rinsing clean the filter unit during operation, the return flow includes a first return flow (return conduit 24) which is recycled to the pressure-elevated flow (pressure conduit 16) and which is larger than the inflow, and further includes a second return flow which is pressure-restricted with respect to the first return flow, and the second return flow is returned to the inflow.

8 Claims, 1 Drawing Sheet

METHOD AND APPARATUS FOR PURIFYING WATER

BACKGROUND OF THE INVENTION

The present invention relates to a water purification method, in which an incoming flow of contaminated water is converted to a pressure-elevated flow which through reversed osmosis, nanofiltration, or ultrafiltration in a purification unit is divided into a purified outflow and a non-purified or contaminated outflow which, in turn, is divided into a return flow and a reject flow. The invention also relates to an arrangement for carrying out the method.

It is known in water purification processes in which reversed osmosis (RO) and ultrafiltration (UF) are employed that the quotient between the flow of purified water and contaminated water can be increased when some of the waste water is allowed to circulate through the purification process. It is also known within RO-technology and UF-technology to allow the major part of the waste water either to return to a point which lies upstream of the pressure boosting pump or to allow the water to be returned to a point downstream of that pump for circulation in a high-pressure region with the aid of a separate circulation pump.

The advantage with the first system lies in its simplicity, while the disadvantage with the system is that it requires a relatively high degree of pump work. Consequently, the first system is applied preferably on small plants which do not require the highest energy efficiency. A divided flow can be taken from the maximum nominal flow relatively easily. The second system which employs internal circulation is more complicated, since it requires an additional pump and circulation flow conduits. Although this system is more energy effective, it is more expensive to provide, because of the intricate control system required to take a divided flow from the maximum nominal flow with low energy losses.

SUMMARY OF THE INVENTION

The object of the present invention is to provide a method and an arrangement of the kind mentioned in the introduction which will eliminate the drawbacks of the known systems so that a high energy efficiency can be achieved with the aid of small means while, at the same time, obtaining good control properties when branching-off a water flow which is lower than the nominal flow.

According to one aspect of the invention, the recycled flow includes a first return flow, which is returned to the pressure-elevated flow and which is substantially larger than the inflow, and also includes a second return flow which is pressure-limited with respect to the first return flow and which is returned to the inflow. By dividing the recycled flow into two return flows in this way, one return flow may be an unchanging large and constant high-pressure flow to achieve an optimum unit-rinsing effect and a sufficiently high pressure to overcome the counterpressure exerted by the purification unit, while the second return flow can be permitted to vary, through the agency of a pressure control valve, such as a pressure regulator or pressure-limiting valve, and handle pressure changes occurrent in response to the changes in the purified water outtake. In other words, a high circulation flow can be restricted in a high-pressure purification module essentially independently of other operating conditions. Consequently, the high-pressure pump need not be a speed regulated pump, but can be driven by an inexpensive alternating current motor.

Other features of the invention and advantages afforded thereby will be evident from the following detailed description.

BRIEF DESCRIPTION OF THE DRAWING

The invention will now be described in more detail with reference to exemplifying embodiments thereof and also with reference to the accompanying drawing, in which.

DETAILED DESCRIPTION

Figure 1:
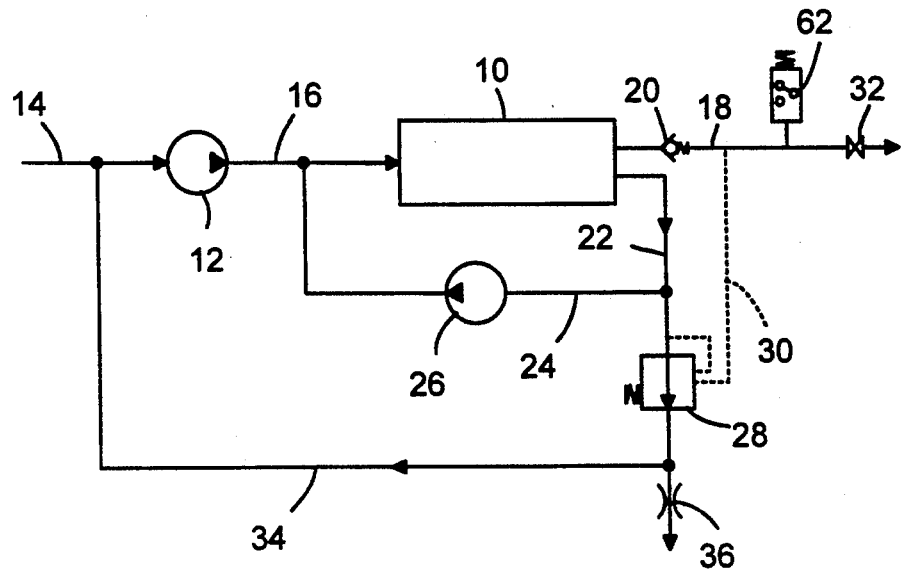
FIG. 1 is a simplified block schematic of an inventive arrangement or system.

In the FIG. 1 embodiment, water to be purified is passed to a purifying or filtering unit 10 through an inlet pipe 14, a high-pressure pump 12 and a pressure line 16. Extending from the filtering unit 10 is an outlet conduit 18 for purified water and an outlet conduit 32 for the rejected or contaminated water which has passed through the filtering unit. The high-pressure pump 12 is conveniently a displacement pump, for instance a lamella pump, which is able to manage a water flow that is substantially proportional to the speed of the pump.

The filter unit 10 is of a known kind and may include either a semi-permeable membrane which functions in accordance with the reverse osmosis principle, or a nanofilter or an ultrafilter type, as desired.

Such a filter unit 10 will normally include an essentially tubular separator unit (not shown) having a supporting structure which supports the aforesaid membrane or filter. Water to be purified is streamed or flushed past the outside of the unit under an overpressure, so that a given part of the water will be pressed through the unit and into its tubular interior for further transportation as purified water. In order to maintain the lowest possible pressure drop across the filter unit, with the intention of reducing the energy cost of the requisite pump work, it is endeavoured to maintain a low concentration of the loose or particulate contaminants on the outer surface of the membrane or the filters, these impurities otherwise tending to collect on those surfaces and therewith increase the pressure drop by virtue of increased osmotic counterpressure or blockaging of the filters. As mentioned in the introduction, it is known to return a given quantity of the pressurized non-filtered water, or reject, to the filter unit so as to continuously rinse the unit clean of impurities.

One such rinsing circuit is included in the FIG. 1 embodiment and comprises a return conduit 24 which branches from the outlet conduit 22 and which incorporates a centrifugal-type circulation pump 26, for instance a side-channel pump, having a large flow, which is more than at least five and preferably more than ten times greater than the flow rate delivered by the high-pressure pump 12. The water circulating in the return line 24 is intended to be held at a high pressure, generated by the high-pressure pump 12, which is determined by a pressure control valve in the form of a pressure-limiting valve 28 connected in the return conduit downstream of the outlet conduit 22. The valve 28 is controlled through the agency of a control line 30 in response to the pressure occurrent in the purified water outlet conduit 18. In turn, this pressure is determined by the pressure drop across a purified-water tapping valve or tap 32, so that when the tapping valve 32 is opened to a small extent, the pressure-limiting valve 28 will allow more reject to pass to the return conduit 34 so that the high pressure prevailing in the return conduit 24 will not rise above a predetermined level. The outlet conduit 18 may also incorporate a purified-water non-return valve 20 which when the tapping valve 32 is closed will maintain the control pressure in the conduit to the pressure-limiting valve 28.

A second return conduit 34 branches from the outlet conduit 22 downstream of the pressure-limiting valve 28. This second return conduit is active in returning part of the flow which passes through the pressure-limiting valve 28 to the inlet conduit 14, i.e. to a point upstream of the high-pressure pump 12. That part of the contaminated water which always leaves the system to a waste outlet passes through a throttle or preferably through a constant flow valve 36.

In other words, there is obtained with the aforedescribed arrangement of the double return conduits 24, 34 and the pressure-limiting valve 28 in a simple control/technical manner, a circulation flow of high pressure and of high substantially constant flow and a circulation flow of low pressure which is allowed to vary in response to the outtake of purified water. Thus, not only the circulation pump 26 can be driven at a constant speed but also the high-pressure pump 12, which enables the pump drive motors to consist of inexpensive alternating current motors, for instance induction motors.

Figure 2:
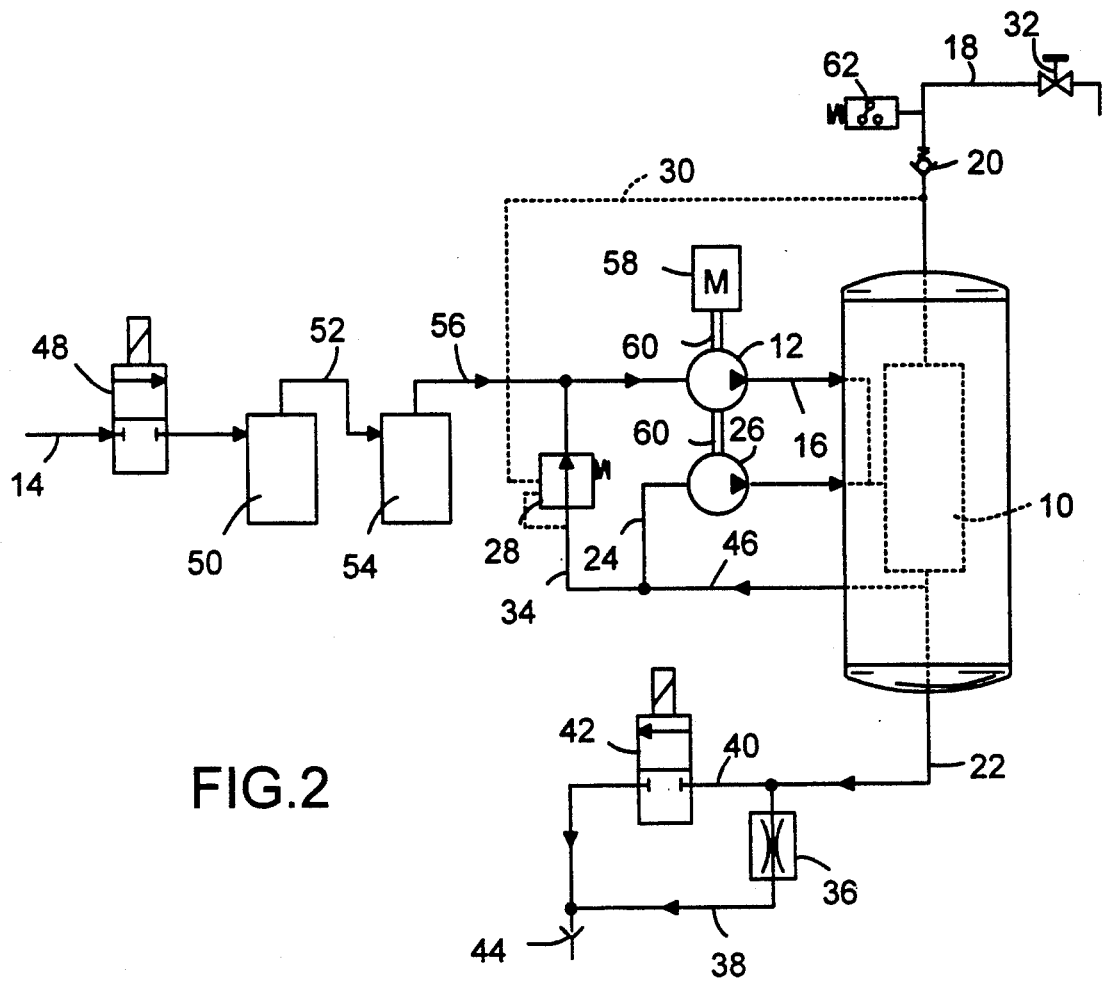
FIG. 2 illustrates a modified embodiment of the invention schematically and in more detail.

FIG. 2 illustrates in more detail a slightly modified version of the exemplifying embodiment shown in FIG. 1. Those parts of the FIG. 2 embodiment which correspond functionally to similar parts of the FIG. 1 embodiment have been identified with the same reference numerals.

The main difference between the embodiment illustrated in FIG. 1 and the embodiment illustrated in FIG. 2 is that in the FIG. 2 embodiment, the pressure-limiting valve 28 which is responsive to the pressure of the outgoing purified water and which handles the variations in flow caused thereby is placed in the variable flow return conduit instead of in the outlet conduit between the two return conduits of the FIG. 1 embodiment. In this case, the outlet conduit for the contaminated water is divided into a return conduit 46 and a reject conduit 22 within the filter unit 10, as illustrated schematically in the Figure. The reject conduit 22 extends to an outlet 44 via the constant flow valve 36 incorporated in an associated conduit 38 and is also provided with a shunt 40 which incorporates a magnetically controlled rinsing valve 42. The rinsing valve 42 is normally held closed, but can be opened by a control device (not shown) when the filter unit requires additional rinsing.

The second branch 46 of the outlet conduit, which in this case is under high pressure, branches into a circulation conduit 24, which incorporates the pump 26, and a first high-pressure part of the second return conduit 34, which terminates in the pressure-limiting valve 28, whereafter the pressure-limited return flow is returned to an inlet conduit 56 where it is mixed with newly arriving water and transported to the high-pressure pump 12.

As indicated in the aforegoing, because the pumps are able to work at a constant speed, it is possible with suitable dimensioning for the pumps to be driven by a common motor 58 via a common drive shaft 60, 60 as illustrated in FIG. 2. This will result in a simple construction obtained at low costs.

In the case of the FIG. 2 embodiment, the inlet conduit 14 for the water to be purified also incorporates an inlet valve 48 and two filter houses 50 and 54 which are connected in series with one another through the agency of a conduit 52. The first, 50, of these filter houses may contain a particle filter and the other filter housing, 54, may contain an active carbon filter for preparatory cleaning of the incoming water.

The purified-water outlet conduit 18 may conveniently incorporate a pressure switch 62 which functions to switch the setting of the motor 58 and/or the valve 48 when a preset maximum or minimum pressure is reached in the conduit 18, through the agency of an electronic control circuit (not shown).

We claim:
1. A method for purifying water, comprising:
   (a) converting an inflow of non-purified water to a pressure-elevated flow;
   (b) dividing said pressure-elevated flow by any one of reverse osmosis, nanofiltration and ultrafiltration, in a purifying unit, into a purified outflow and a concentrate outflow;
   (c) dividing said concentrate outflow into a first return flow and a second flow;
   (d) returning said first return flow to said pressure-elevated flow at a flow rate substantially larger than that of said inflow;
   (e) dividing said second flow into a third flow, and a rejected flow;
   (f) restricting the pressure of said second flow with respect to that of said first return flow prior to dividing said second flow; and
   (g) returning said third flow to said inflow.
2. The method of claim 1, wherein:
said first return flow has a volume flow rate which is more than about five times the combined volume flow rate of said inflow and said third return flow.
3. The method of claim 1, wherein:
said first return flow has a volume flow rate which is more than about ten times the combined volume flow rate of said inflow and said third return flow.
4. The method of claim 1, further including:
causing said third return flow to vary in pressure in response to the pressure of said purified outflow.
5. An arrangement for purifying water, comprising:
an inlet conduit;
a high-pressure pump incorporated in said inlet conduit and thereby dividing said inlet conduit into a low-pressure side upstream of said pump and a high-pressure side downstream of said pump, said pump being adapted to deliver non-purified water through said high-pressure side of said inlet conduit to a purifying unit operating by any one of reverse osmosis, nanofiltration and ultrafiltration;
said purifying unit having an outlet conduit for purified water and an outlet conduit for concentrate;
a first return conduit extending from said concentrate outlet conduit to said high-pressure side of the inlet conduit;
said first return conduit including a circulation pump;
a second return conduit branching from said concentrate outlet conduit in parallel with said first return conduit and extending to said low-pressure side of said inlet conduit; and a pressure control on said concentrate outlet conduit valve adapted to maintain said first return conduit at a higher pressure than that of said second return conduit.

6. The arrangement of claim 5, wherein:
said high-pressure pump is a displacement pump.

7. The arrangement of claim 5, wherein:
said circulation pump is a side channel pump.

8. The arrangement of claim 5, wherein:
said pressure control valve is upstream of where said first return conduit branches from said concentrate outlet conduit.

* * * * *